United States Patent
Han et al.

(10) Patent No.: US 6,496,333 B1
(45) Date of Patent: *Dec. 17, 2002

(54) DUAL STRIPE MAGNETORESISTIVE (DSMR) HEAD WITH CO-EXTENSIVE MAGNETORESISTIVE (MR)/DIELECTRIC/ MAGNETORESISTIVE (MR) STACK LAYER EDGES

(75) Inventors: Cherng-Chyi Han, San Jose, CA (US); Mao-Min Chen, San Jose, CA (US)

(73) Assignee: Headway Technologies, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1038 days.

(21) Appl. No.: 09/044,764

(22) Filed: Mar. 20, 1998

Related U.S. Application Data (62) Division of application No. 08/738,208, filed on Oct. 25, 1996, now Pat. No. 5,783,460.

(51) Int. Cl.⁷ ................................................. G11B 5/39
(52) U.S. Cl. ......................................................... 360/315
(58) Field of Search ................................. 360/113, 315

(56) References Cited

U.S. PATENT DOCUMENTS

| | | | | |
|---|---|---|---|---|
| 3,860,965 A | * | 1/1975 | Voegeli | 360/113 |
| 4,012,781 A | * | 3/1977 | Lin | 360/113 |
| 4,356,523 A | * | 10/1982 | Yeh | 360/113 |
| 4,686,472 A | * | 8/1987 | Van Ooije et al. | 360/113 |
| 5,296,987 A | * | 3/1994 | Anthony et al. | 360/113 |
| 5,309,305 A | * | 5/1994 | Nepela et al. | 360/113 |
| 5,327,313 A | * | 7/1994 | Nishioka et al. | 360/113 |
| 5,337,203 A | * | 8/1994 | Kitada et al. | 360/113 |
| 5,406,433 A | * | 4/1995 | Smith | 360/113 |
| 5,424,890 A | * | 6/1995 | Suyama et al. | 360/113 |
| 5,875,078 A | * | 2/1999 | Suyama et al. | 360/113 |
| 5,880,910 A | * | 3/1999 | Shouji et al. | 360/113 |
| 5,896,251 A | * | 4/1999 | Ohsawa et al. | 360/113 |

FOREIGN PATENT DOCUMENTS

| | | | |
|---|---|---|---|
| JP | 08-235539 | * | 9/1996 |

* cited by examiner

*Primary Examiner*—Craig A. Renner
(74) *Attorney, Agent, or Firm*—George O. Saile; Stephen B. Ackerman (57) ABSTRACT

The invention comprises a pair of dual stripe magnetoresistive (DSMR) sensor elements with aligned edges of a pair of patterned magnetoresistive (MR) layers within the pair of dual stripe magnetoresistive (DSMR) sensor elements. A first embodiment of the dual stripe magnetoresistive (DSMR) sensor element employs a patterned first magnetoresistive (MR) layer, a patterned inter stripe dielectric layer and a patterned second magnetoresistive (MR) layer which are areally co-extensive, and thus have all edges thereof fully aligned. A second embodiment of the dual stripe magnetoresistive (DSMR) sensor element employs a patterned first magnetoresistive (MR) layer, a pattern ed inter stripe dielectric layer and a patterned second magnetoresistive (MR) layer, where: (1) at least a portion of an edge of the patterned first magnetoresistive (MR) layer, the pattern ed inter stripe dielectric layer and the patterned second magnetoresistive (MR layer opposite an air bearing surface (ABS) of the dual stripe magnetoresistive (DSMR) sensor element are fully aligned; and (2) there is employed a patterned backfilling dielectric layer covering those fully aligned edges of the patterned first magnetoresistive (MR) layer, the pattern ed inter stripe dielectric layer and the patterned second magnetoresistive (MR) layer, where the patterned backfilling dielectric layer does not completely cover a top surface of the patterned second magnetoresistive (MR) layer.

5 Claims, 5 Drawing Sheets

DUAL STRIPE MAGNETORESISTIVE (DSMR) HEAD WITH CO-EXTENSIVE MAGNETORESISTIVE (MR)/DIELECTRIC/ MAGNETORESISTIVE (MR) STACK LAYER EDGES

CROSS-REFERENCE TO RELATED APPLICATION

This application is a divisional application of application Ser. No. 08/738,208, filed Oct. 25, 1996, now U.S. Pat. No. 5,783,460, titled "Method of Making Self-Aligned Dual-Stripe Magnetoresistive (DSMR) Head for High Density Recording."

BACKGROUND OF THE INVENTION

1. Field of the Invention

The present invention relates generally to dual stripe magnetoresistive (DSMR) sensor elements employed in dual stripe magnetoresistive (DSMR) read-write heads for magnetic data storage and retrieval. More particularly, the present invention relates to a method for forming a self-aligned dual stripe magnetoresistive (DSMR) sensor element employed within a dual stripe magnetoresistive (DSMR) read-write head for magnetic data storage and retrieval.

2. Description of the Related Art

The recent and continuing advances in computer and information technology have been made possible not only by the correlating advances in the functionality, reliability and speed of semiconductor integrated circuits, but also by the correlating advances in storage density of direct access storage devices (DASDs) employed in digitally encoded magnetic data storage and retrieval. Storage density of direct access storage devices (DASDs) is typically measured as areal storage density of a magnetic data storage medium formed upon a rotating magnetic data storage disk within a direct access storage device (DASD) enclosure. The areal storage density is defined largely by the track width, the track spacing and the linear magnetic domain density within the magnetic data storage medium. The track width, the track spacing and the linear magnetic domain density are in turn determined by several principal factors, including but not limited to: (1) the magnetic read-write characteristics of a magnetic read-write head employed in reading and writing digitally encoded magnetic data into and from the magnetic data storage medium; (2) the magnetic domain characteristics of the magnetic data storage medium which is formed upon the rotating magnetic data storage disk; and (3) the separation distance of the magnetic read-write head from the rotating magnetic data storage disk.

With regard to magnetic read-write heads employed in reading and writing digitally encoded magnetic data into and from a magnetic data storage disk, it has become common in the art to employ magnetoresistive (MR) sensor elements, and in particular dual stripe magnetoresistive (DSMR) sensor elements, as read elements within those magnetic read-write heads since magnetoresistive (MR) sensor elements, and in particular dual stripe magnetoresistive (DSMR) sensor elements, provide high output digital signals, with good linear resolution, independent of the relative velocity of a magnetic data storage medium with respect to the magnetoresistive (MR) sensor element or the dual stripe magnetoresistive (DSMR) sensor element.

Although dual stripe magnetoresistive (DSMR) read-write heads employing dual stripe magnetoresistive (DSMR) sensor elements have thus become quite common in reading and writing digitally encoded magnetic data into and from magnetic data storage media, dual stripe magnetoresistive (DSMR) read-write heads are not entirely without problems. In particular, it is known in the art that dual stripe magnetoresistive (DSMR) read-write heads of optimal read performance are typically only obtained when there is a matching of electrical and magnetic properties between the two magnetoresistive (MR) layers within the dual-stripe magnetoresistive (DSMR) sensor element from which is formed the dual stripe magnetoresistive (DSMR) read-write head. In general, the factors which affect the matching of the two magnetoresistive (MR) layers within a dual stripe magnetoresistive (DSMR) sensor element include but are not limited to: (1) the physical widths of the two magnetoresistive (MR) layers; (2) the alignment of the two magnetoresistive (MR) layers; (3) the read widths of the two magnetoresistive (MR) layers; (4) the sheet resistances of the two magnetoresistive (MR) layers; and (5) the magnetic properties of the two magnetoresistive (MR) layers. As areal density of digitally encoded magnetic data increases, tolerances within the foregoing factors typically need to be minimized to assure optimal read characteristics of digitally encoded magnetic data read with dual stripe magnetoresistive (DSMR) read-write heads. In particular, it is desired in order to assure optimal read properties of a dual stripe magnetoresistive (DSMR) sensor element to eliminate or minimize the tolerance variations with respect to width and/or alignment between the two magnetoresistive (MR) layers within the dual stripe magnetoresistive (DSMR) sensor element. It is towards that goal that the present invention is directed.

SUMMARY OF THE INVENTION

A first object of the present invention is to provide a method for minimizing tolerance variations with respect to the width and/or alignment between the two magnetoresistive (MR) layers within a dual stripe magnetoresistive (DSMR) sensor element.

A second object of the present invention is to provide a method in accord with the first object of the present invention, which method is readily manufacturable.

In accord with the objects of the present invention, there is provided by the present invention a method for minimizing tolerance variations with respect to width and/or alignment between the two magnetoresistive (MR) layers within a dual stripe magnetoresistive (DSMR) sensor element, as well as the dual stripe magnetoresistive (DSMR) sensor element formed through the method. To practice the method of the present invention, there is first provided a substrate having formed thereupon a pair of patterned first conductor lead layers which in turn has formed and aligned thereupon a pair of patterned first anti-ferromagnetic longitudinal magnetic biasing layers, where the horizontal separation of the pair of patterned first conductor lead layers and the pair of patterned first anti-ferromagnetic longitudinal magnetic biasing layers defines a track width of the substrate. There is then formed upon the substrate layer a blanket first magnetoresistive (MR) layer, where the blanket first magnetoresistive (MR) layer contacts and completely covers the track width of the substrate and contacts and at least partially covers the pair of patterned first anti-ferromagnetic longitudinal magnetic biasing layers. There is then formed upon the blanket first magnetoresistive (MR) layer a blanket inter-stripe dielectric layer. There is then formed upon the blanket inter-stripe dielectric layer a blanket second magnetoresistive (MR) layer. There is then formed upon the blanket second magnetoresistive (MR) layer a first lift off stencil. The first lift off stencil comprises: (1) a first etched patterned soluble underlayer; and (2) a first patterned masking layer formed upon and overhanging the first etched patterned soluble underlayer, where the first lift off stencil completely overlaps the track width of the substrate and at least partially overlaps the pair of patterned first anti-ferromagnetic longitudinal magnetic biasing layers. There is then employed the first lift off stencil as a first etch mask in forming from the blanket second magnetoresistive (MR) layer, the blanket inter stripe dielectric layer and the blanket first magnetoresistive (MR) layer a patterned second magnetoresistive (MR) layer, a patterned inter stripe dielectric layer and a patterned first magnetoresistive (MR) layer with fully aligned edges. There is then employed the first lift off stencil as a first lift off mask to form a patterned dielectric layer over the substrate, where the patterned dielectric layer covers the fully aligned edges of the patterned second magnetoresistive (MR) layer, the patterned inter stripe dielectric layer and the patterned first magnetoresistive (MR) layer. There is then removed the first lift off stencil from the patterned second magnetoresistive (MR) layer. There is then formed a second lift off stencil upon the patterned second magnetoresistive (MR) layer. The second lift off stencil comprises: (1) a second etched patterned soluble underlayer; and (2) a second patterned mask layer formed upon and overhanging the second etched patterned soluble underlayer, where the width of the second lift off stencil is substantially equal to and substantially centered within the track width of the substrate. The second lift-off stencil is then employed as a second lift off mask in forming upon the patterned second magnetoresistive (MR) layer a pair of patterned second anti-ferromagnetic longitudinal magnetic biasing layers having formed and aligned thereupon a pair of patterned second conductor lead layers. After forming upon the patterned second magnetoresistive (MR) layer the pair of patterned second longitudinal magnetic biasing layers having formed and aligned thereupon the pair of patterned second conductor lead layers, the second lift off stencil is removed from the patterned second magnetoresistive (MR) layer.

A second embodiment of the present invention employs a third lift off stencil as a third etch mask for trimming and aligning mis-aligned portions of: (1) a patterned first magnetoresistive (MR) layer having formed thereupon a pair of patterned first conductor lead layers; and (2) a patterned second magnetoresistive (MR) layer having formed thereupon a pair of patterned second conductor lead layers, within a dual stripe magnetoresistive (DSMR) sensor element, where: (1) the patterned first magnetoresistive (MR) layer is separated from the patterned second magnetoresistive (MR) layer by an inter stripe dielectric layer; and (2) the mis-aligned portions of the patterned first magnetoresistive (MR) layer and the patterned second magnetoresistive (MR) layer are trimmed and aligned on the side of the dual stripe magnetoresistive (DSMR) sensor element opposite the air bearing surface (ABS) side of the dual stripe magnetoresistive (DSMR) sensor element. The third lift off stencil is then employed as a third lift off mask in backfilling with a patterned dielectric layer the exposed edges of the trimmed patterned first magnetoresistive (MR) layer and the trimmed patterned second magnetoresistive (MR) layer.

There is provided by the present invention a method for minimizing tolerance variations with respect to the width and/or alignment between the two magnetoresistive (MR) layers within a dual stripe magnetoresistive (DSMR) sensor element. The first embodiment of the method of the present invention achieves this goal through sequentially patterning, while employing a first lift off stencil as a first etch mask, a blanket second magnetoresistive (MR) layer, a blanket inter stripe dielectric layer and a blanket first magnetoresistive (MR) layer to form a patterned second magnetoresistive (MR) layer, a patterned inter stripe dielectric layer and a patterned first magnetoresistive (MR) layer with fully aligned edges, while subsequently employing the first lift off stencil as a first lift off mask in forming a patterned dielectric layer which covers the fully aligned edges of the patterned second magnetoresistive (MR), the patterned inter stripe dielectric layer and the patterned first magnetoresistive (MR) layer formed from the corresponding blanket layers. The second embodiment of the method of the present invention achieves this goal through trimming, while employing a third lift off stencil as a third etch mask, mis-aligned portions of: (1) a patterned first magnetoresistive (MR) layer having formed thereupon a pair of patterned first conductor lead layers; and (2) a patterned second magnetoresistive (MR) layer having formed thereupon a pair of patterned second conductor lead layers, where: (1) the patterned first magnetoresistive (MR) layer is separated from the patterned second magnetoresistive (MR) layer by an inter stripe dielectric layer; and (2) the mis-aligned portions of the patterned first magnetoresistive (MR) layer and the patterned second magnetoresistive (MR) layer are trimmed and aligned on the side of a dual stripe magnetoresistive (DSMR) sensor element opposite the air bearing surface (ABS) side of the dual stripe magnetoresistive (DSMR) sensor element.

The method of the present invention is readily manufacturable. The first embodiment of the method of the present invention provides a novel ordering of dual stripe magnetoresistive (DSMR) sensor element fabrication processes generally known in the art of dual stripe magnetoresistive sensor (DSMR) sensor element fabrication. Both the first embodiment of the method of the present invention and the second embodiment of the method of the present invention employ lift off stencils sequentially as: (1) etch masks for forming at least partially aligned magnetoresistive (MR) layers within dual stripe magnetoresistive (DSMR) sensor elements; and (2) lift off masks for forming patterned insulator layers covering the edges of the aligned magnetoresistive (MR) layers within the dual stripe magnetoresistive (DSMR) sensor elements. Since methods and materials through which lift off stencils may be formed are similarly generally known in the art of dual stripe magnetoresistive (DSMR) sensor element fabrication, the first embodiment of the method of the present invention and the second embodiment of the method of the present invention are readily manufacturable.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENTS

The present invention provides a method for minimizing tolerance variations with respect to the width and/or alignment between the two magnetoresistive (MR) layers within a dual stripe magnetoresistive (DSMR) sensor element. A first preferred embodiment of the method of the present invention achieves this goal through sequentially patterning, while employing a first lift off stencil as a first etch mask, a blanket second magnetoresistive (MR) layer, a blanket inter stripe dielectric layer and a blanket first magnetoresistive (MR) layer to form a patterned second magnetoresistive (MR) layer, a patterned inter stripe dielectric layer and a patterned first magnetoresistive (MR) layer with fully aligned edges, while subsequently employing the first lift off stencil as a first lift off mask in forming a patterned dielectric layer which covers the fully aligned edges of the patterned second magnetoresistive (MR), the patterned inter stripe dielectric layer and the patterned first magnetoresistive (MR) layer. The second embodiment of the method of the present invention achieves this goal through trimming, while employing a third lift off stencil as a third etch mask, mis-aligned portions of (1) a patterned first magnetoresistive (MR) layer having formed thereupon a pair of patterned first conductor lead layers; and (2) a patterned second magnetoresistive (MR) layer having formed thereupon a pair of patterned second conductor lead layers, where: (1) the patterned first magnetoresistive (MR) layer is separated from the patterned second magnetoresistive (MR) layer by an inter stripe dielectric layer; and (2) the mis-aligned portions of the patterned first magnetoresistive (MR) layer and the patterned second magnetoresistive (MR) layer are trimmed and aligned on the side of a dual stripe magnetoresistive (DSMR) sensor element opposite the air bearing surface (ABS) side of the dual stripe magnetoresistive (DSMR) sensor element.

First Embodiment

Figure 1:
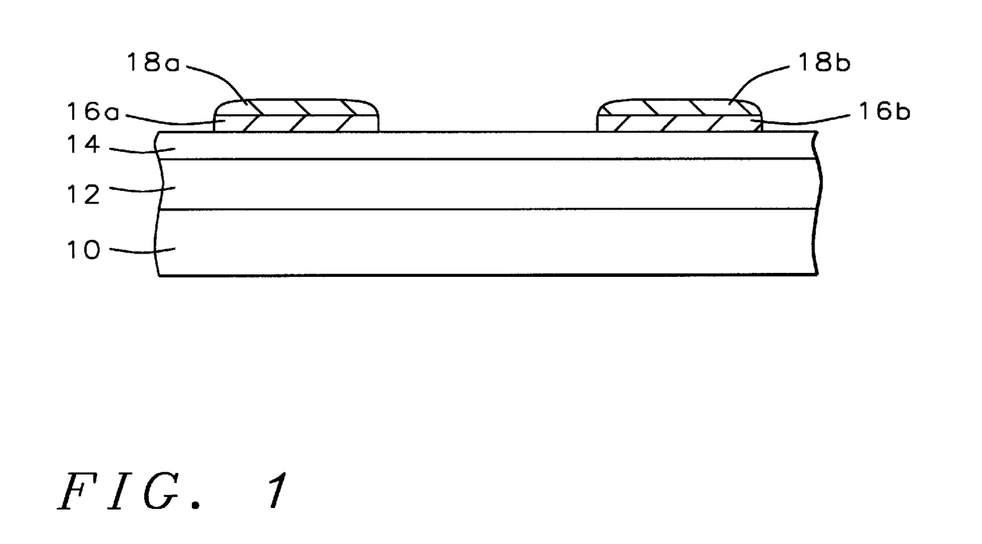
FIG. 1 to FIG. 6 show a series of schematic cross-sectional diagrams illustrating the results of progressive stages in forming a dual stripe magnetoresistive (DSMR) sensor element in accord with the first preferred embodiment of the method of the present invention.

Referring now to FIG. 1 to FIG. 6, there is shown a series of schematic cross-sectional diagrams illustrating the results of progressive process stages in forming a dual stripe magnetoresistive (MR) sensor element in accord with the first preferred embodiment of the method of the present invention. Shown in FIG. 1 is a schematic cross-sectional diagram of the dual stripe magnetoresistive (DSMR) sensor element at an early stage in its fabrication.

Shown in FIG. 1 is a substrate 10 having formed thereupon a shield layer 12 which in turn has formed thereupon a first dielectric layer 14. Substrates upon which, in general, may be formed magnetoresistive (MR) sensor elements and upon which in particular may be formed the dual stripe magnetoresistive (DSMR) sensor element of the present invention are known in the art of magnetoresistive (MR) sensor element fabrication and dual stripe magnetoresistive (DSMR) sensor element fabrication. Typically and preferably, the substrate 10 is a non-magnetic inorganic substrate which is either: (1) subsequently diced and laminated in forming a slider assembly when forming a magnetoresistive (MR) read-write head which is employed within a direct access storage device (DASD) magnetic data storage enclosure; or (2) subsequently diced and machined in forming a slider assembly when forming a magnetoresistive (MR) read-write head which is employed within a direct access storage device (DASD) magnetic data storage enclosure.

Similarly with the substrate 10, both shield layers and dielectric layers are also known in the arts of magnetoresistive (MR) sensor element fabrication and dual stripe magnetoresistive (DSMR) sensor element fabrication. For the first preferred embodiment of the present invention, both the shield layer 12 and the first dielectric layer 14 may be formed through any of several methods and materials through which shield layers and dielectric layers are conventionally formed within the arts of magnetoresistive (MR) sensor element fabrication and dual stripe magnetoresistive (DSMR) sensor element fabrication. Typically and preferably, the shield layer 12 is formed from a magnetic shield material selected from the group including but not limited to permalloy (nickel-iron alloy), iron-tantalum nitride and amorphous alloy magnetic shield materials. Typically and preferably, the dielectric layer 14 is formed from a dielectric material selected from the group of dielectric materials including but not limited to silicon oxide, silicon nitride and aluminum oxide dielectric materials. Preferably, the shield layer 12 is from about 15000 to about 30000 angstroms thick while the first dielectric layer 14 is from about 300 to about 1200 angstroms thick.

There is also shown in FIG. 1 the presence of a pair of patterned first conductor lead layers 16a and 16b having formed and aligned thereupon a pair of patterned first anti-ferromagnetic longitudinal magnetic biasing layers 18a and 18b. The patterned first conductor lead layers 16a and 16b, and the patterned first anti-ferromagnetic longitudinal magnetic biasing layers 18a and 18b define, by their separation, a track width of the substrate 10. Preferably, the track width of the substrate 10 is from about 0.2 to about 10 microns, while the width of each of the patterned first conductor lead layers 16a and 16b upon the first dielectric layer 14 is also from about 0.2 to about 10 microns.

Conventionally, patterned conductor lead layers are typically and preferably formed within dual stripe magnetoresistive (DSMR) sensor elements from conductor materials including but not limited aluminum, copper, gold and/or silver containing conductor materials. Similarly, although several anti-ferromagnetic materials are also suitable for forming patterned anti-ferromagnetic longitudinal magnetic biasing layers within dual stripe magnetoresistive (DSMR) sensor elements, including but not limited to several hard magnetic materialssuch as but not limited to iron-manganese alloys, iron-manganese alloys are conventionally most common in forming patterned anti-ferromagnetic longitudinal magnetic biasing layers within dual stripe magnetoresistive (DSMR) sensor elements. Both patterned conductor lead layers and patterned anti-ferromagnetic longitudinal magnetic biasing layers may be formed within dual stripe magnetoresistive (DSMR) sensor elements through patterning of blanket anti-ferromagnetic longitudinal magnetic biasing layers and blanket conductor lead layers formed through methods as are conventional in the art, including but not limited to thermally assisted evaporation methods, electron beam assisted evaporation methods and physical vapor deposition (PVD) sputtering methods.

While any of several methods and materials may be employed in forming the patterned conductor lead layers 16a and 16b and the patterned anti-ferromagnetic longitudinal magnetic biasing layers 18a and 18b within the first preferred embodiment of the method of the present invention, it is preferred that the patterned conductor lead layers 16a and 16b and the patterned anti-ferromagnetic biasing layers 18a and 18b are formed through a one step lift off method employing a lift off stencil (not shown), since when employing a one step lift off method there is formed composite self aligned patterned conductor lead layer and patterned anti-ferromagnetic longitudinal magnetic biasing layer stacks with a taper (as shown in FIG. 1) which facilitates forming subsequent layers of the dual stripe magnetoresistive (DSMR) sensor element upon the structure whose schematic cross-sectional diagram is illustrated in FIG. 1. In addition, since it is in part a novel feature of the first preferred embodiment of the method of the present invention that the patterned first conductor lead layers 16a and 16b, and the patterned first anti-ferromagnetic longitudinal magnetic biasing layers 18a and 18b, are formed prior to forming a patterned first magnetoresistive (MR) layer contacting the patterned first anti-ferromagnetic longitudinal magnetic biasing layers 18a and 18b, it is also preferred within the first preferred embodiment of the method of the present invention to form the patterned first conductor lead layers 16a and 16b from a material to which electrical connections may readily be formed through the patterned first anti-ferromagnetic longitudinal magnetic biasing layers 18a and 18b. Typically and preferably, the patterned first conductor lead layers 16a and 16b exhibiting this characteristic are formed from gold containing conductor materials or refractory metal conductor materials.

Figure 2:
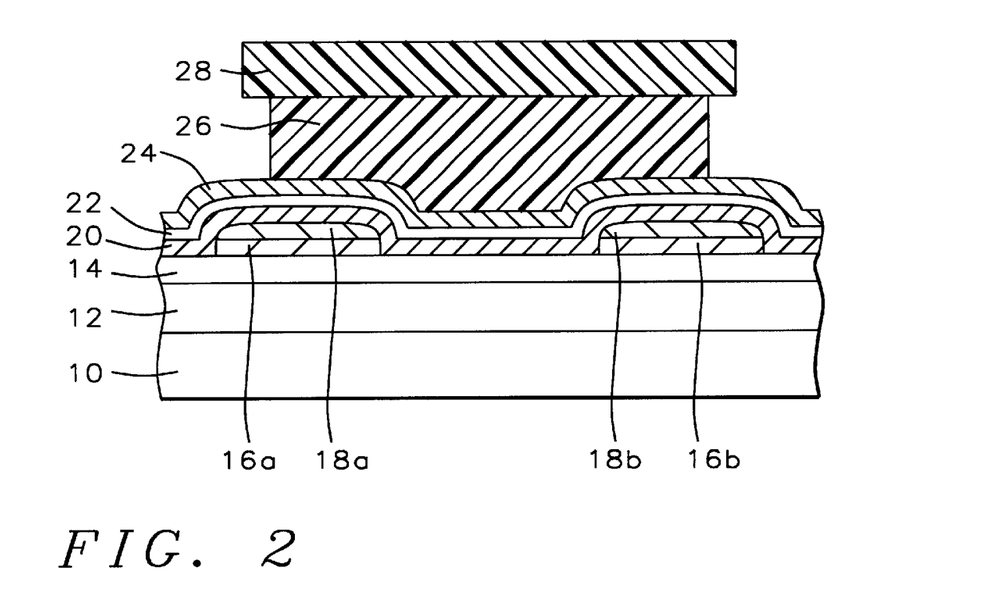

Referring now to FIG. 2, there is shown a schematic cross-sectional diagram illustrating the results of further processing of the dual stripe magnetoresistive (DSMR) sensor element whose schematic cross-sectional diagram is illustrated in FIG. 1.

First, there is shown in FIG. 2 a series of three blanket layers formed upon the exposed surfaces of the first dielectric layer 14, the patterned first conductor lead layers 16a and 16b and the patterned first anti-ferromagnetic longitudinal magnetic biasing layers 18a and 18b. The three blanket layers are: (1) a blanket first magnetoresistive (MR) layer 20 formed upon the exposed surfaces of the first dielectric layer 14, the patterned first conductor lead layers 16a and 16b and the patterned first anti-ferromagnetic longitudinal magnetic biasing layers 18a and 18b; (2) a blanket inter stripe dielectric layer 22 formed upon the blanket first magnetoresistive (MR) layer 20; and (3) a blanket second magnetoresistive (MR) layer 24 formed upon the blanket inter stripe dielectric layer 22. Methods and materials through which blanket layers such as each of the foregoing three blanket layers may be formed within dual stripe magnetoresistive (DSMR) sensor elements are conventional in the art of dual stripe magnetoresistive (DSMR) sensor element fabrication. In general, the inter stripe dielectric layer 22 may be formed through methods and materials analogous to the methods and materials employed in forming the first dielectric layer 14. Preferably, the inter stripe dielectric layer 22 so formed is formed of an aluminum oxide dielectric material at a thickness of from about 100 to about 900 angstroms.

In addition, blanket magnetoresistive (MR) layers are typically formed within dual stripe magnetoresistive (DSMR) sensor elements through methods including but not limited to thermally assisted evaporation methods, electron beam assisted evaporation methods and physical vapor deposition (PVD) sputtering methods through which are formed blanket magnetoresistive (MR) layers of magnetoresistive (MR) materials typically, although not exclusively, of permalloy (ie: nickel-iron alloy) materials. For the first preferred embodiment of the method of the present invention, both the blanket first magnetoresistive (MR) layer 20 and the blanket second magnetoresistive (MR) layer 24 are preferably formed of a permalloy (nickel-iron alloy, 80:20 w/w) magnetoresistive (MR) material, as is most common in the art. Preferably, each of the blanket first magnetoresistive (MR) layer 20 and the blanket second magnetoresistive (MR) layer 24 is formed to a thickness of from about 100 to about 500 angstroms.

Although not specifically illustrated by the schematic cross-sectional diagram of FIG. 2, the blanket first magnetoresistive layer 20 must completely cover the track width of the substrate 10 and at least partially cover each of the patterned first anti-ferromagnetic longitudinal magnetic biasing layers 18a and 18b. In addition, while the blanket second magnetoresistive (MR) layer 24 and the blanket inter stripe dielectric layer 22 are shown as co-extensive with the blanket first magnetoresistive (MR) layer 20, as is typical and preferable within the first preferred embodiment of the method of the present invention, it is only required within the first preferred embodiment of the method of the present invention that the blanket second magnetoresistive (MR) layer 24 and the blanket inter stripe dielectric layer 22 are sufficiently co-extensive with the blanket first magnetoresistive (MR) layer 20 such that when all three blanket layers are sequentially patterned through a single anisotropic etch method the resulting three patterned layers will have fully aligned edges.

Finally, there is also shown in FIG. 2 the presence of a first lift off stencil formed upon the blanket second magnetoresistive (MR) layer 24. The first lift off stencil is formed from a first etched patterned soluble underlayer 26 having formed symmetrically overhanging thereupon a first patterned mask layer 28. The first lift off stencil completely covers the track width of the substrate 10 and at least partially covers the patterned first anti-ferromagnetic longitudinal magnetic biasing layers 18a and 18b and the patterned first conductor lead layers 16a and 16b.

Within the first preferred embodiment of the method of the present invention, the first lift off stencil may be formed through any of several methods as are known in the art, which will typically include a photolithographic patterning of a first blanket mask layer and a first blanket soluble underlayer, to form a first patterned mask layer such as the first patterned mask layer 28 and a first patterned soluble underlayer, followed by further isotropic etching of the first patterned soluble underlayer to form a first etched patterned soluble underlayer such as the first etched patterned soluble underlayer 26. While any of several materials may be employed in forming the first blanket soluble underlayer, including but not limited to photoresist materials and organic polymer materials, within the first preferred embodiment of the method of the present invention the first blanket soluble underlayer is preferably formed of a polymer material. Preferably, the first blanket soluble underlayer, and the first etched patterned soluble underlayer 26 are from about 1000 to about 2500 angstroms thick. Similarly, while any of several materials may also be employed in forming the first blanket mask layer, including but not limited to metals, metal oxides, silicon oxides, silicon nitrides and photoresists, for the first preferred embodiment of the method of the present invention, the first blanket mask layer is preferably formed of a photoresist material. Preferably, the first blanket mask layer, and the first patterned mask layer 28, are each from about 10000 to about 20000 angstroms thick. Preferably, the symmetric overhang of the first patterned mask layer 28 over each sidewall of the first etched patterned soluble underlayer 26 is from about 1000 to about 5000 angstroms.

Figure 3:
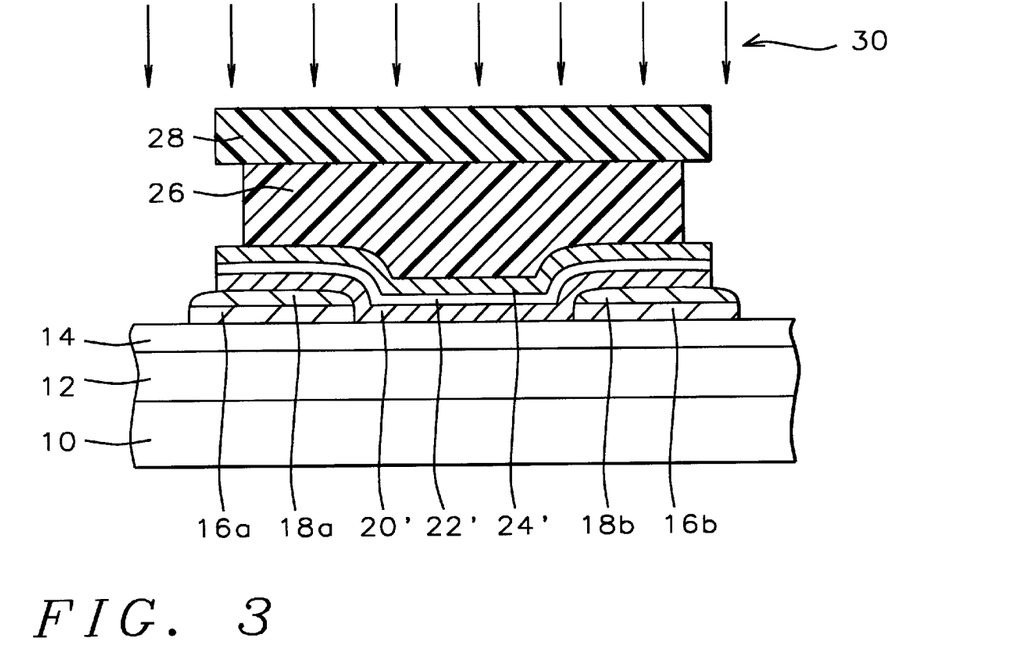

Referring now to FIG. 3, there is shown the results of further processing of the dual stripe magnetoresistive (DSMR) sensor element whose schematic cross-sectional diagram is shown in FIG. 2. Shown in FIG. 3 is the results of anisotropic etching through a first defocused ion beam 30, while employing the first lift off stencil as a first etch mask the blanket second magnetoresistive (MR) layer 24, the blanket inter stripe dielectric layer 22 and the blanket first magnetoresistive (MR) layer 20 to form a patterned second magnetoresistive (MR) layer 24', a patterned inter stripe dielectric layer 22' and a patterned first magnetoresistive (MR) layer 20' with fully aligned edges. As is illustrated within the schematic cross-sectional diagram of FIG. 3, neither the patterned second magnetoresistive (MR) layer 24', nor the patterned inter stripe dielectric layer 22' nor the patterned first magnetoresistive (MR) layer 20' is planar. The first defocused ion beam 30 etching may be undertaken through defocused ion beam etch methods as conventional in the art, typically and preferably employing endpoint detection methods as are similarly conventional in the art. The first defocused ion beam 30 preferably employs argon sputtering ions at an energy of from about 0.20 to about 0.60 keV, although other sputtering ions, as well as other anisotropic etching methods, may be employed when forming the patterned first magnetoresistive (MR) layer 20', the patterned inter stripe dielectric layer 22' and the patterned second magnetoresistive layer 24'.

Figure 4:
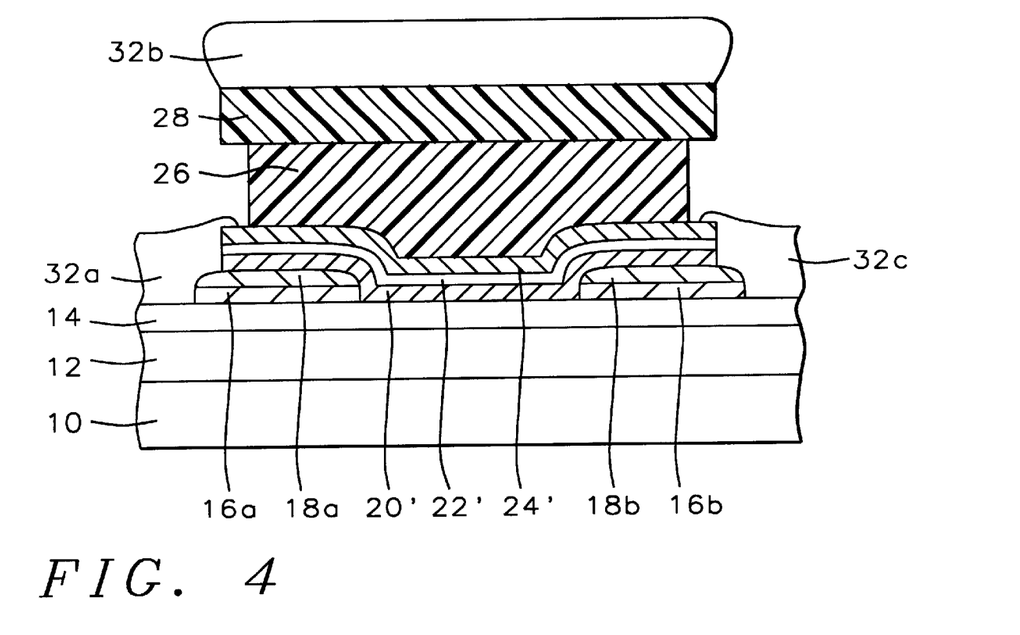

Referring now to FIG. 4 there is shown the results of further processing of the dual stripe magnetoresistive (DSMR) sensor element whose schematic cross-sectional diagram is illustrated in FIG. 3. Shown in FIG. 4 is the results of forming, while employing the first lift off stencil as a first lift off mask, a pair of patterned second dielectric layers 32a and 32c upon the first dielectric layer 14. When employing the first lift off stencil as a first lift off mask, there is also simultaneously formed the patterned second dielectric layer residue 32b upon first patterned mask layer 28. Preferably, the patterned second dielectric layers 32a and 32c, and the patterned second dielectric layer residue 32b, are formed through methods and materials analogous or equivalent to the methods and materials which are employed in forming the blanket inter stripe dielectric layer 22 and the first dielectric layer 14. Due to the anisotropic etching character of the first defocused ion beam 30 and the surface mobility and scattering effects of sputtered atoms employed in forming the patterned second dielectric layers 32a and 32c, the patterned second dielectric layers 32a and 32b extend into the overhang region of the first lift off stencil and cover the exposed fully aligned edges of the patterned first magnetoresistive (MR) layer 20', the patterned inter stripe dielectric layer 22' and the patterned second magnetoresistive (MR) layer 24'. Preferably, the patterned second dielectric layers 32a and 32c are formed to a thickness sufficient to completely cover the fully aligned exposed edges of the patterned first magnetoresistive (M) layer 20', the patterned inter stripe dielectric layer 22' and the patterned second magnetoresistive (MR) layer 24'. Under circumstances where the patterned first magnetoresistive (MR) layer 20', the patterned inter stripe dielectric layer 22' and the patterned second magnetoresistive (MR) layer 24' are particularly thick, or when it is desired to fully assure that the exposed fully aligned edges of the patterned first magnetoresistive (MR) layer 20', the patterned inter stripe dielectric layer 22' and the patterned second magnetoresistive layer 24' are completely covered, it is preferred and desirable to isotropically etch the first patterned mask layer 28 to symmetrically reduce its width upon the first etched patterned soluble underlayer 26 prior to forming the patterned second dielectric layers 32a and 32c, and the patterned second dielectric layer residue 32b.

Figure 5:
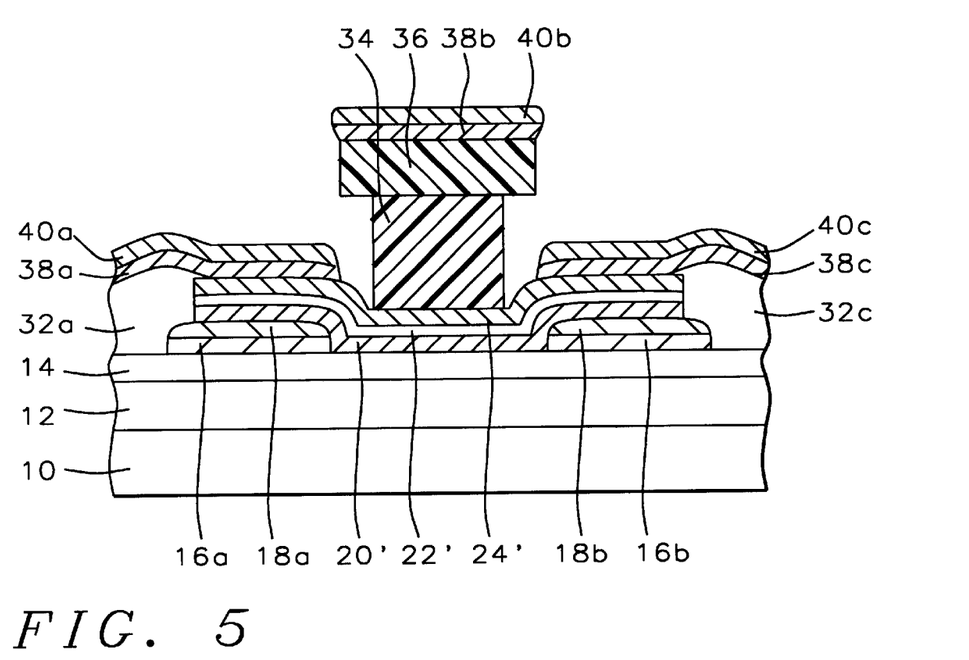

Referring now to FIG. 5, there is shown a schematic cross-sectional diagram illustrating the results of further processing of the dual stripe magnetoresistive (DSMR) sensor element whose schematic cross sectional diagram is illustrated in FIG. 4. Shown in FIG. 5 is a schematic cross-sectional diagram of the dual strip magnetoresistive (DSMR) sensor element whose schematic cross-sectional diagram is illustrated in FIG. 4, but from whose surface has been removed the first lift off stencil. The first lift off stencil may be removed through methods as are conventional in the art, which will typically involve dissolving the first etched patterned soluble underlayer 26 in an appropriate solvent. For the first preferred embodiment of the method of the present invention, where the first etched patterned soluble underlayer 26 is preferably formed of an organic polymer, the first etched patterned soluble underlayer 26 is preferably dissolved within an organic solvent.

There is also shown in FIG. 5 the presence of a second lift off stencil formed upon the patterned second magnetoresistive (MR) layer 24'. The second lift off stencil is formed from a second etched patterned soluble underlayer 34 having formed symmetrically overhanging thereupon a second patterned mask layer 36. The second lift off stencil is preferably formed through methods, materials and thicknesses analogous or equivalent to the methods, materials and thicknesses employed in forming the first lift off stencil. However, the second lift off stencil is formed with a width upon the patterned second magnetoresistive (MR) layer 24' which is substantially equal to and substantially centered within the track width of the substrate 10. Within the context of the first preferred embodiment of the present invention, the second lift off stencil is substantially centered within the track width of the substrate 10 when its centering within the track width of the substrate 10 is limited by the registration tolerance of the photoexposure tooling employed in defining the location of the second lift off stencil within track width of the substrate 10.

Also shown in FIG. 5 is the presence of a pair of patterned second anti-ferromagnetic longitudinal magnetic biasing layers 38a and 38c formed and aligned upon opposite ends of the patterned second magnetoresistive layer 24', and a pair of patterned second conductor lead layers 40a and 40c formed and aligned upon the pair of patterned second anti-ferromagnetic longitudinal magnetic biasing layers 38a and 38c. The pair of patterned second anti-ferromagnetic longitudinal magnetic biasing layers 38a and 38c, and the pair of patterned second conductor lead layers 40a and 40c are preferably formed through methods, materials and thicknesses analogous or equivalent to the methods, materials and thicknesses employed in forming the patterned first conductor lead layers 16a and 16b, and the patterned first anti-ferromagnetic longitudinal magnetic biasing layers 18a and 18b. Since the patterned second anti-ferromagnetic longitudinal magnetic biasing layers 38a and 38c, and the patterned second conductor lead layers 40a and 40c, are formed within the first preferred embodiment of the method of the present invention employing the second lift off stencil as a second lift off mask, there is simultaneously also formed the patterned second anti-ferromagnetic longitudinal magnetic biasing layer residue 38b and the patterned second conductor lead layer residue 40b upon the second lift off stencil when forming the pair of patterned second anti-ferromagnetic longitudinal magnetic biasing layers 38a and 38c, and the patterned second conductor lead layers 40a and 40c.

Figure 6:
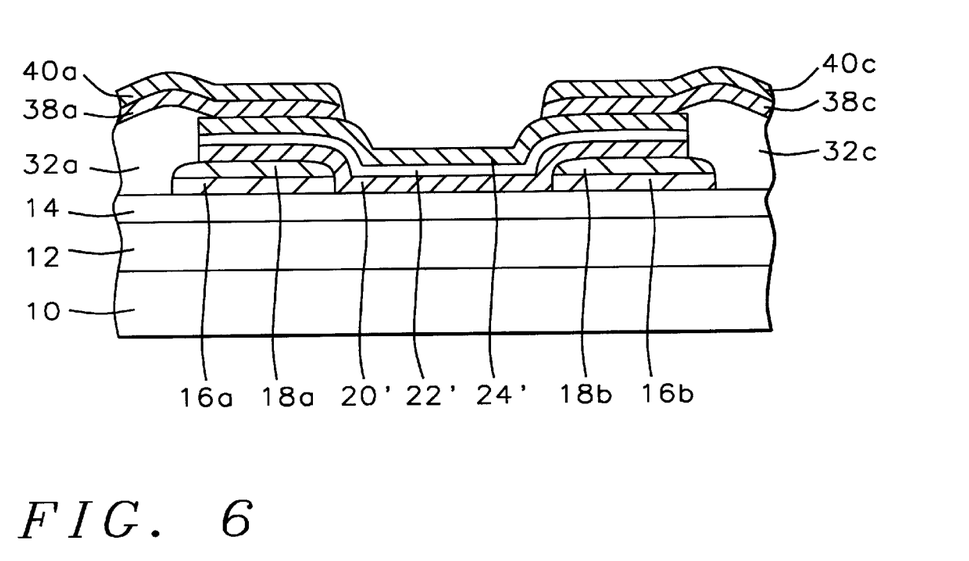

Referring now to FIG. 6, there is shown a schematic cross-sectional diagram illustrating the results of further processing of the dual stripe magnetoresistive (DSMR) sensor element whose schematic cross-sectional diagram is illustrated in FIG. 5. Shown in FIG. 6 is a schematic cross-sectional diagram of the dual stripe magnetoresistive (DSMR) sensor element whose schematic cross-sectional diagram is illustrated in FIG. 5, but from whose surface has been removed the second lift off stencil. The second lift off stencil is preferably removed through methods and materials analogous or equivalent to the methods and materials employed in removing the first lift off stencil from the dual stripe magnetoresistive (DSMR) sensor element whose schematic cross-sectional diagram is illustrated in FIG. 4 (ie: preferably through dissolving the second etched patterned soluble underlayer 34 in an organic solvent). The dual stripe magnetoresistive (DSMR) sensor element whose schematic cross-sectional diagram is illustrated in FIG. 6 may then be fabricated into a dual stripe magnetoresistive (DSMR) read-write head through additional layering methods as are conventional in the art.

Figure 7:
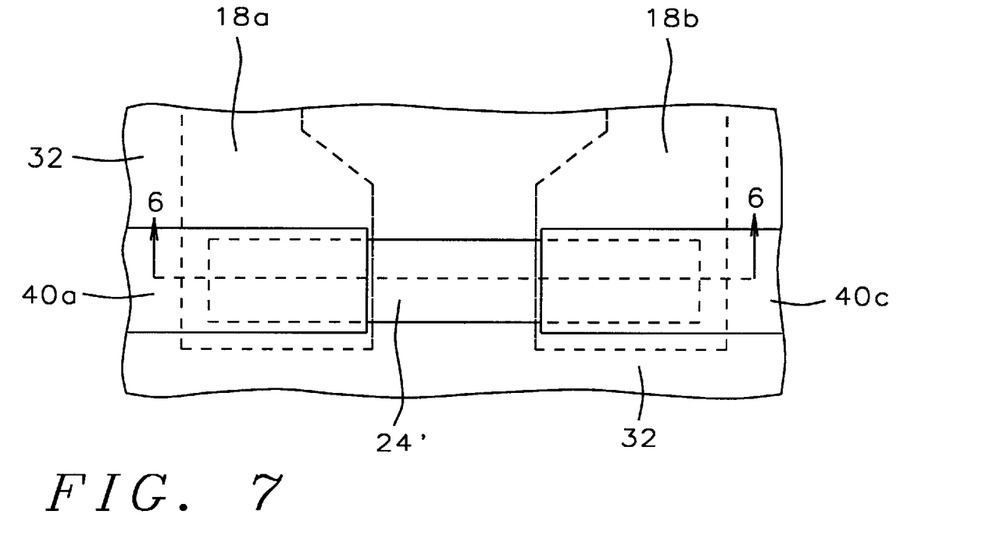
FIG. 7 shows a schematic plan-view diagram corresponding to the schematic cross-sectional diagram of FIG. 6.

Shown in FIG. 7 is a schematic plan-view diagram illustrating the dual stripe magnetoresistive (DSMR) sensor element whose schematic cross-sectional diagram is illustrated in FIG. 6, where the reference line 6—6 corresponds with the cross-section through which is obtained the schematic cross-sectional diagram as illustrated in FIG. 6. Shown in FIG. 7 is the patterned second dielectric layer 32 with the outlines of the patterned first anti-ferromagnetic longitudinal magnetic biasing layers 18a and 18b formed there under. Also shown are the patterned second conductor lead layers 40a and 40c which are formed upon opposite ends of the patterned second magnetoresistive (MR) layer 24'. As is seen from reference to FIG. 6 and FIG. 7, the patterned second magnetoresistive (MR) layer 24' is formed fully self aligned over, and thus areally co-extensive with, the patterned inter stripe dielectric layer 22' and the patterned first magnetoresistive (MR) layer 20'. Therefore, all edges of the patterned second magnetoresistive (MR) layer 24', the patterned inter stripe dielectric layer 22' and the patterned first magnetoresistive (MR) layer 20' are fully aligned. In addition, the patterned second dielectric layer 32 fills completely the fully aligned edges of the patterned first magnetoresistive (MR) layer 20', the patterned inter stripe dielectric layer 22' and the patterned second magnetoresistive (MR) layer 24' since the patterned second dielectric layer 32 is formed employing as a first lift off mask the first lift off stencil which was previously employed as an etch mask in defining the fully aligned edges of the patterned first magnetoresistive (MR) layer 20', the patterned inter stripe dielectric layer 22' and the patterned second magnetoresistive (MR) layer 24'.

Second Embodiment

Figure 8:
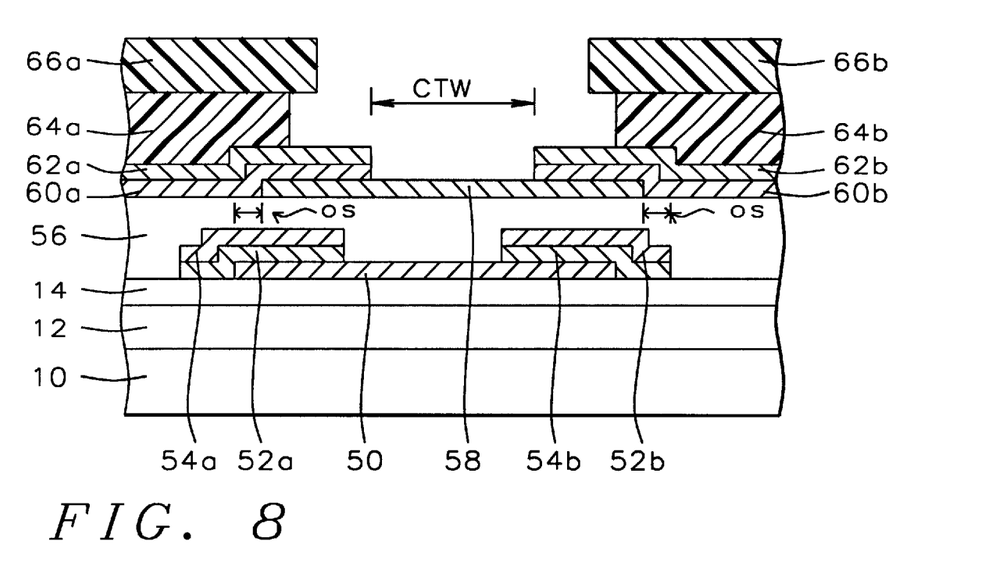
FIG. 8 shows a schematic cross-sectional diagram illustrating an intermediate process stage in forming a dual stripe magnetoresistive (DSMR) sensor element in accord with the second preferred embodiment of the method of the present invention.

Referring now to FIG. 8, there is shown a schematic cross-sectional diagram of a dual stripe magnetoresistive (DSMR) sensor element at the later stages in its formation in accord with the second preferred embodiment of the present invention.

Shown in FIG. 8 is a substrate 10, a shield layer 12 and a first dielectric layer 14 which are otherwise equivalent to the substrate 10, the shield layer 12 and the first dielectric layer 14 described within the first preferred embodiment of the dual stripe magnetoresistive (DSMR) sensor element of the present invention and illustrated within the schematic cross-sectional diagrams of FIG. 1 to FIG. 6. However, the overlying layers which form the dual stripe magnetoresistive (DSMR) sensor element of the second preferred embodiment of the method of the present invention, as illustrated within FIG. 8, are formed with a different and more conventional ordering. In particular, within FIG. 8, there is first formed upon the first dielectric layer 14 a patterned first magnetoresistive layer 50 which subsequently has formed thereupon a pair of patterned first anti-ferromagnetic longitudinal magnetic biasing layers 52a and 52b which in turn have formed and aligned thereupon a pair of patterned first conductor lead layers 54a and 54b, thus reversing the order in which is formed the corresponding patterned first magnetoresistive (MR) layer, patterned first anti-ferromagnetic longitudinal magnetic biasing layers, and patterned first conductor lead layers within the first preferred embodiment of the method of the present invention.

Analogously with the first preferred embodiment of the method of the present invention, there is then formed upon the patterned first magnetoresistive layer 50, the patterned first anti-ferromagnetic longitudinal magnetic biasing layers 52a and 52b and the patterned first conductor lead layers 54a and 54b a blanket inter stripe dielectric layer 56. There is then formed upon the blanket inter stripe dielectric layer 56 a patterned second magnetoresistive (MR) layer 58 along with a pair of patterned second anti-ferromagnetic longitudinal magnetic biasing layers 60a and 60b patterned upon opposite ends of the patterned second magnetoresistive layer 58, and a corresponding pair of patterned second conductor lead layers 62a and 62b formed and aligned upon the pair of patterned second anti-ferromagnetic longitudinal magnetic biasing layers 60a and 60b. The materials and dimensions through which are formed the foregoing patterned magnetoresistive layers, patterned anti-ferromagnetic longitudinal magnetic biasing layers, patterned conductor lead layers and blanket inter stripe dielectric layer are preferably analogous or equivalent to the materials and dimensions through which are formed the corresponding patterned magnetoresistive layers, patterned anti-ferromagnetic longitudinal magnetic biasing layers, patterned conductor lead layers and blanket inter stripe dielectric layer within the first preferred embodiment of the method of the present invention.

Important to the second preferred embodiment of the method of the present invention is the requirement that the patterned first magnetoresistive layer 50 and the patterned second magnetoresistive layer 58 are offset with respect to each other, through a physical offset OS as illustrated in FIG. 8. Such a physical offset is typically a consequence of forming the patterned first magnetoresistive (MR) layer 50 through a lithographic method independent of the lithographic method employed in forming the patterned second magnetoresistive (MR) layer 58. Thus, such a physical offset is common in forming dual stripe magnetoresistive (DSMR) sensor elements through methods as are conventional in the art. In addition, within the second preferred embodiment of the method of the present invention, there is a composite track width CTW, as also illustrated in FIG. 8, of the patterned first magnetoresistive (MR) layer 50 and the patterned second magnetoresistive (MR) layer 58, where the composite track width CTW is defined by the offset of the patterned first magnetoresistive (MR) layer 50 with respect to the patterned second magnetoresistive (MR) layer 58, the separation distance of the patterned first conductor lead layers 54a and 54b and the separation distance of the patterned second conductor lead layers 62a and 62b. Typically and preferably, the offset if from about 0.1 to about 2.0 microns and the composite track width is from about 0.2 to about 10.0 microns.

Finally, there is shown in FIG. 8 the presence of a third lift off stencil which is formed from a pair of third etched patterned soluble underlayers 64a and 64b and a pair of third patterned masking layers 66a and 66b, where the third patterned masking layers 66a and 66b symmetrically overhang the third etched patterned soluble underlayers 64a and 64b. The third etched patterned soluble underlayers 64a and 64b, and the third patterned masking layers 66a and 66b, within the third lift off stencil are preferably formed through methods, materials and thicknesses analogous or equivalent to the methods, materials and thicknesses employed in forming the corresponding etched patterned soluble underlayers and patterned masking layers within the first lift off stencil and the second lift off stencil employed within the first preferred embodiment of the method of the present invention.

Figure 9:
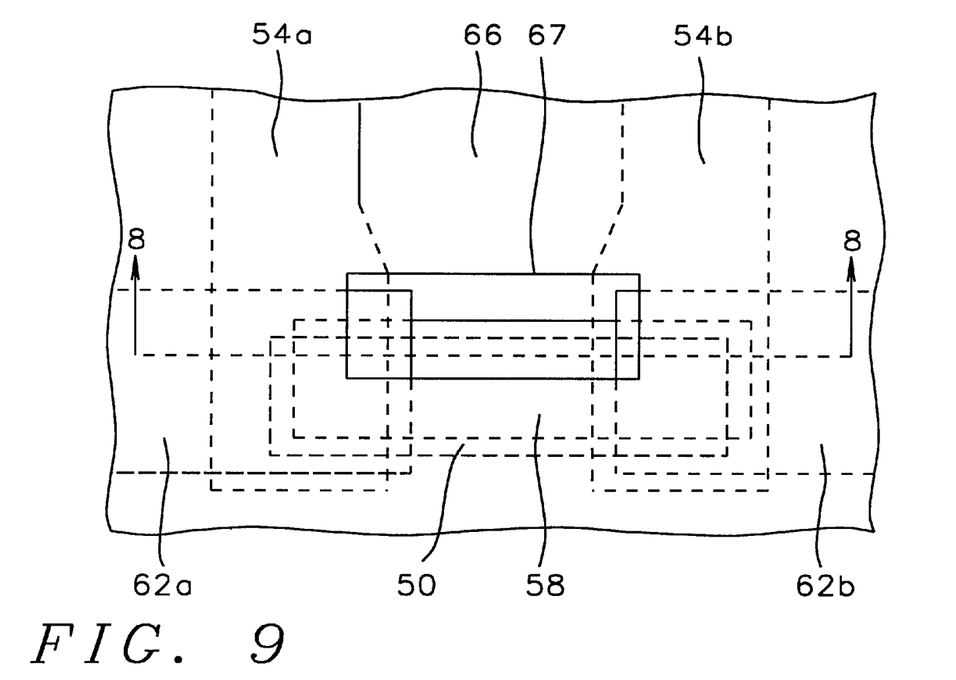
FIG. 9 and FIG. 10 show a pair of plan-view schematic diagrams illustrating the results of progressive process stages in forming the dual stripe magnetoresistive (DSMR) sensor element through further processing of the dual stripe magnetoresistive (DSMR) sensor element whose schematic cross-sectional diagram is illustrated in FIG. 8.

Referring now to FIG. 9, there is shown a schematic plan-view diagram illustrating the dual stripe magnetoresistive (DSMR) sensor element whose schematic cross-sectional diagram is illustrated in FIG. 8, where the reference line 8—8 corresponds with the cross-section through which is obtained the schematic cross-sectional diagram as illustrated in FIG. 8. Shown in FIG. 9 is a window 67 within the third patterned masking layer 66 through which is exposed a portion of the patterned second magnetoresistive (MR) layer 58, as well as portions of the patterned second conductor lead layers 62a and 62b. Within the second preferred embodiment of the present invention, the window 67 leaves exposed a portion of the patterned second magnetoresistive (MR) layer 58 at the side of the patterned second magnetoresistive (MR) layer 58 opposite the air bearing surface (ABS) of the dual stripe magnetoresistive (DSMR) sensor element.

Similarly with the first preferred embodiment of the present invention, the layers of the dual stripe magnetoresistive (DSMR) sensor element sequentially exposed through the window 67 within the third lift off stencil are sequentially etched, while employing the third lift off stencil as a third etch mask, with an anisotropic etch method, preferably an anisotropic etch method employing a defocused ion beam. The layers are sequentially etched until there is reached the first dielectric layer 14.

Figure 10:
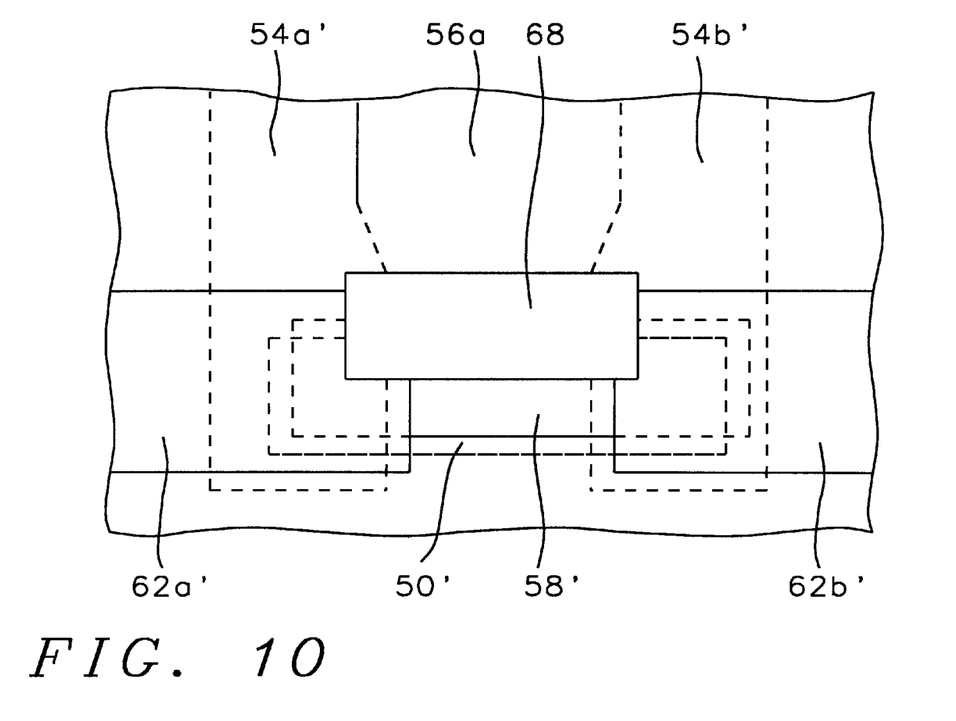

Referring now to FIG. 10 there is shown a schematic plan-view diagram illustrating the results of further processing of the dual stripe magnetoresistive (DSMR) sensor element whose schematic plan-view diagram is illustrated in FIG. 9, where the portions of the dual stripe magnetoresistive (DSMR) sensor element successively exposed within the window 67 formed within the third lift off stencil are removed until there is reached the first dielectric layer 14. Similarly with the first lift off stencil employed within the first preferred embodiment of the present invention, subsequent to reaching the first dielectric layer 14, the third lift off stencil is also employed as a lift off mask in forming a backfilling dielectric layer within the aperture formed within the dual stripe magnetoresistive (DSMR) sensor element at the location of the window 67. Shown in FIG. 10 is a plan-view schematic diagram of the dual stripe magnetoresistive (DSMR) sensor element so formed after removal of the third lift off stencil.

Shown in FIG. 10 is: (1) a trimmed patterned first magnetoresistive layer 50'; and (2) a pair of trimmed patterned first conductor lead layers 54a' and 54b' formed beneath a patterned inter stripe dielectric layer 56a, while there is formed upon the patterned inter stripe dielectric layer 56a a trimmed patterned second magnetoresistive layer 58' upon whose opposite ends are formed a pair of trimmed patterned second conductor lead layers 62a' and 62b'. Finally, there is shown in FIG. 10 a patterned inter stripe dielectric layer patch 68 which is backfilled into the dual stripe magnetoresistive (DSMR) sensor element. Analogously with the first preferred embodiment of the present invention, under circumstances where the patterned inter stripe dielectric layer patch 68 is particularly thick, it is preferred to isotropically etch and widen the window 67 within the third lift off stencil subsequent to employing the third lift off stencil as the etch mask and prior to employing the lift off stencil as the lift off mask so that the patterned inter stripe dielectric layer patch 68 optimally covers the aligned edges of the trimmed patterned second magnetoresistive (MR) layer 58' and the trimmed patterned first magnetoresistive (MR) layer 50'. As is illustrated within the schematic plan-view diagram of FIG. 10, the patterned inter stripe dielectric layer patch 68 does not completely cover a top surface of the trimmed patterned second magnetoresistive (MR) layer 58' which separates: (1) the portion of the edge of the trimmed patterned first magnetoresistive (MR) layer 50', the portion of the edge of the patterned inter stripe dielectric layer 56a and the portion of the edge of the trimmed patterned second magnetoresistive (MR) layer 58' which are fully aligned from; (2) the air bearing surface (ABS) of the dual-stripe magnetoresistive (DSMR) sensor element whose schematic cross-sectional and plan-view diagrams are illustrated within FIG. 8 to FIG. 10.

Upon forming the dual stripe magnetoresistive (DSMR) sensor element whose schematic plan-view diagram is illustrated in FIG. 10, there is formed a dual stripe magnetoresistive (DSMR) sensor element with improved, but not optimal, alignment between the patterned magnetoresistive (MR) layers within the dual stripe magnetoresistive (DSMR) sensor element. As it is not uncommon within dual stripe magnetoresistive (DSMR) sensor element fabrication to further machine the air bearing surface of a dual stripe magnetoresistive (DSMR) sensor element when fabricating the dual stripe magnetoresistive (DSMR) sensor element into a slider assembly when forming a dual stripe magnetoresistive (DSMR) read write head, further aligning of the mis-aligned patterned magnetoresistive (MR) layers at the air bearing surface (ABS) side of the dual stripe magnetoresistive (DSMR) read-write head so formed is also achievable.

As is understood by a person skilled in the art the dual stripe magnetoresistive (DSMR) sensor element formed through either of the two preferred embodiments of the method of the present invention may include, when fabricated in a dual stripe magnetoresistive (DSMR) read-write head, several other layers in addition to the layers illustrated in FIG. 1 to FIG. 10. Such other layers may include, but are not limited to additional shield layers, coil layers, passivation layers, conductive connection/interconnection layers, resin layers, overcoating layers and terminations layers. Such other layers may be formed in locations within the dual stripe magnetoresistive (DSMR) sensor element or dual stripe magnetoresistive (DSMR) read-write head formed through the method of the present invention where those layers would conventionally be expected to be formed.

As is further understood by a person skilled in the art, the preferred embodiments of the method of the present invention are illustrative of the present invention rather than limiting of the present invention. Revisions may be made to methods, materials, structures and dimensions through which is formed the dual stripe magnetoresistive (DSMR) sensor element through the preferred embodiments of the method of the present invention while still forming a dual stripe magnetoresistive (DSMR) sensor element through a method in accord with the spirit and scope of the present invention, as defined by the accompanying claims.

What is claimed is:

1. A dual-stripe magnetoresistive (DSMR) sensor element comprising:

a substrate;

a patterned first magnetoresistive (MR) layer formed over the substrate;

a patterned inter-stripe dielectric layer formed upon the patterned first magnetoresistive (MR) layer; and a patterned second magnetoresistive (MR) layer formed upon the patterned inter-stripe dielectric layer, where the patterned first magnetoresistive (MR) layer, the patterned inter-stripe dielectric layer and the patterned second magnetoresistive (MR) layer are areally co-extensive and thus all edges of the patterned first magnetoresistive (MR) layer, the patterned inter-stripe dielectric layer and the patterned second magnetoresistive (MR) layer are fully aligned, and where at least one of the patterned first magnetoresistive (MR) layer, the patterned inter-stripe dielectric layer and the patterned second magnetoresistive (MR) layer is non-planar.

2. The dual-stripe magnetoresistive (DSMR) sensor element of claim 1 further comprising:

a patterned dielectric layer formed over the substrate, the patterned dielectric layer completely and symmetrically covering a series of fully aligned edges of the patterned first magnetoresistive (MR) layer, the patterned inter-stripe dielectric layer and the patterned second magnetoresistive (MR) layer, the patterned dielectric layer not completely covering a top surface of the patterned second magnetoresistive (MR) layer.

3. The dual-stripe magnetoresistive (MR) sensor element of claim 1 further comprising:

a pair of patterned first anti-ferromagnetic longitudinal magnetic biasing layers formed interposed between the substrate and the patterned first magnetoresistive (MR) layer, each patterned first anti-ferromagnetic longitudinal magnetic biasing layer within the pair of patterned first anti-ferromagnetic longitudinal magnetic biasing layers contacting and forming an interface with the patterned first magnetoresistive (MR) layer, where each interface within the pair of interfaces of the pair of patterned first anti-ferromagnetic longitudinal magnetic biasing layers with the patterned first magnetoresistive (MR) layer is tapered.

4. A dual-stripe magnetoresistive (DSMR) sensor element comprising:

a substrate;

a patterned first magnetoresistive (MR) layer formed over the substrate;

a patterned inter-stripe dielectric layer formed upon the patterned first magnetoresistive (MR) layer;

a patterned second magnetoresistive (MR) layer formed upon the patterned inter-stripe dielectric layer, where at least a portion of an edge of the patterned first magnetoresistive (MR) layer, a portion of an edge of the patterned inter-stripe dielectric layer and a portion of an edge of the patterned second magnetoresistive (MR) layer are fully aligned, where the portion of the edge of the patterned first magnetoresistive (MR) layer, the portion of the edge of the patterned inter-stripe dielectric layer and the portion of the edge of the patterned second magnetoresistive (MR) layer which are fully aligned are opposite an air bearing surface (ABS) of the dual-stripe magnetoresistive (DSMR) sensor element; and a patterned dielectric layer formed covering the portion of the edge of the patterned first magnetoresistive (MR) layer, the portion of the edge of the patterned inter-stripe dielectric layer and the portion of the edge of the patterned second magnetoresistive (MR) layer which are fully aligned, the patterned dielectric layer not completely covering a top surface of the patterned second magnetoresistive (MR) layer, where the top surface of the patterned second magnetoresistive (MR) layer separates the portion of the edge of the patterned first magnetoresistive (MR) layer, the portion of the edge of the patterned inter-stripe dielectric layer and the portion of the edge of the patterned second magnetoresistive (MR) layer which are fully aligned from the air bearing surface (ABS) of the dual-stripe magnetoresistive (DSMR) sensor element.

5. The dual-stripe magnetoresistive (MR) sensor element of claim 1 wherein each of the patterned first magnetoresistive (MR) layer, the patterned inter-stripe dielectric layer and the patterned second magnetoresistive (MR) layer is non-planar.

* * * * *